US010800891B1

(12) United States Patent
Kent et al.

(10) Patent No.: US 10,800,891 B1
(45) Date of Patent: Oct. 13, 2020

(54) CONVERSION OF LIGNIN INTO A WATER-SOLUBLE POLYACID USING A MOF CATALYST

(71) Applicant: National Technology & Engineering Solutions of Sandia, LLC, Albuquerque, NM (US)

(72) Inventors: Michael S. Kent, Albuquerque, NM (US); Mark D. Allendorf, Pleasanton, CA (US); Vitalie Stavila, Pleasanton, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 380 days.

(21) Appl. No.: 15/452,487

(22) Filed: Mar. 7, 2017

Related U.S. Application Data

(60) Provisional application No. 62/305,402, filed on Mar. 8, 2016.

(51) Int. Cl.
| | | |
|---|---|---|
| *C08H 7/00* | (2011.01) | |
| *C09D 11/08* | (2006.01) | |
| *C09D 11/107* | (2014.01) | |
| *B01J 31/16* | (2006.01) | |
| *C08L 97/00* | (2006.01) | |

(52) U.S. Cl.
CPC ............ *C08H 6/00* (2013.01); *B01J 31/1691* (2013.01); *C08L 97/005* (2013.01); *C09D 11/08* (2013.01); *C09D 11/107* (2013.01); *B01J 2231/70* (2013.01)

(58) Field of Classification Search
CPC ..... C08H 6/00; B01J 31/1691; B01J 2231/70; C08L 97/00–02
See application file for complete search history.

(56) References Cited

U.S. PATENT DOCUMENTS

| | | | |
|---|---|---|---|
| 8,664,305 B2 | 3/2014 | Benko et al. | |
| 9,102,801 B1 | 8/2015 | Dirk et al. | |
| 9,347,923 B1 | 5/2016 | Allendorf et al. | |
| 9,428,525 B1 | 8/2016 | Talin et al. | |
| 2009/0062516 A1* | 3/2009 | Belanger ................ | C13K 13/00 530/502 |
| 2012/0026224 A1 | 2/2012 | Anthony et al. | |
| 2014/0001028 A1* | 1/2014 | Sastre Calabuig ..... | C07C 29/50 204/157.63 |

OTHER PUBLICATIONS

Abstract of Kent et al., "Polyacid dispersants from lignin," preasented at Symposium on Biotechnology for Fuels and Chemicals, Apr. 25-28, 2016, Baltimore, MD (2016).*

(Continued)

*Primary Examiner* — Kregg T Brooks
(74) *Attorney, Agent, or Firm* — Medley, Behrens & Lewis, LLC

(57) ABSTRACT

A process for valorization of lignin includes the steps of mixing lignin; a MOF catalyst metalated with a metal atom selected from the group consisting of Fe, Mn, Co, Cu, or Ni, and combinations thereof; an oxidizing agent; and an aqueous solvent. The product of this process, a charged polyacid-containing species derived from lignin, may be included in a dispersion with a dispersible particulate material, and an aqueous dispersing medium.

19 Claims, 9 Drawing Sheets

(56) References Cited

OTHER PUBLICATIONS

Abstract of Stavila et al., "Metal-organic frameworks as selective catalysts for carbon-oxygen bond cleavage in lignin model compounds," presented at 249th ACS National Meeting and Exposition, Denver, CO, Mar. 22-26, 2015 (Year: 2015).*
Abstract of Allendorf et al., "MOF-based catalysts for lignin degradation," presented at 248th ACS National Meeting and Exposition, San Francisco, CA, Aug. 10-14, 2014 (Year: 2014).*
Masingale et al., "An Oxidant to Replace Nitrobenzene in Lignin Analysis," Bioresources 4(3), 1139-1146 (Year: 2009).*
Kent et al., "Polyacid Dispersants from Lignin," Report SAND2016-2839C (Year: 2016).*
ASTM International, ASTM E2865-12 (2012).*
Masingale et al., "Microwave assisted synthesis of metal organic framework molecules as catalysis for the oxidation of hardwood lignin," Abstracts of Papers, 234th ACS National Meeting, Boston MA (2007).*
Napoly et al., "H2O2-Mediated Kraft Lignin Oxidation with Readily Available Metal Salts: What about the Effect of Ultrasound?", Ind. & Eng'g Chem. Res. 54, 6046-6051 (2015).*
Xiang et al., "Oxidative Cracking of Precipitated Hardwood Lignin by Hydrogen Peroxide," Appl. Biochem. & Biotechnol. vol. 84-86, 153-162 (2000).*
Presentation slides for Allendorf, et al., "MOF-Based Catalysts for Lignin Degradation", presented at 248th ACS National Meeting and Exposition, San Francisco, CA, Aug. 10-14, 2014 (25 pages).
Presentation slides for Stavila, et al., "Metal-Organic Frameworks as Selective Catalysts for Carbon-Oxygen Bond Cleavage in Lignin Model Compounds", presented at 249th ACS National Meeting and Exposition, Denver, CO, Mar. 22-26, 2015 (26 pages).
Presentation slides for Kent et al., "Polyacid dispersants from lignin," presented at Symposium on Biotechnology for Fuels and Chemicals, Apr. 25-28, 2016, Baltimore, MD (30 pages).
Bai, et al., "Zr-based metal-organic frameworks: design, synthesis, structure, and applications", In Chem. Soc. Rev., The Royal Society of Chemistry, DOI: 10.1039/c5cs00837a, Feb. 17, 2016, 41 pages.

The Dow Chemical Company, "Acumer 1510", Technical Data Sheet, 713-00021-0712-EN, Jul. 2012, pp. 1-4.
Eddaoudi, "Systematic Design of Pore Size and Functionality in Isoreticular MOFs and Their Application in Methane Storage", In Science, vol. 295, Jan. 18, 2002, pp. 469-472.
Estelle, et al., "Lignin as Dispersant for Water-Based Carbon Nanotubes Nanofluids: Impact on Viscosity and Thermal Conductivity", In International Communications in Heat and Mass Transfer, vol. 57, 2014, pp. 8-12.
Fei, et al., "A robust, catalytic metal-organic framework with open 2,2'-bipyridine sites", In Chem. Commun., The Royal Society of Chemistry, vol. 50, 2014, pp. 4810-481.
Fei, et al., "Robust, Catalytic Metal-Organic Framework with open 2,2'-bipyridine sites Supporting Information", In Chem. Commun., The Royal Society of Chemistry, vol. 50, 2014, pp. S1-S13.
Lee, "Metal-organic framework materials as catalysts", In Chem. Soc. Rev., The Royal Society of Chemistry, vol. 38, 2009, p. 1450-1459 (Mar. 17, 2009).
Rochez, et al., "Dispersion of Multiwalled Carbon Nanotubes in Water by Lignin", In J. Mater Science, vol. 48, Jan. 25, 2013, pp. 4962-4964.
Rohm and Haas, "Acumer 4300", Mar. 2004, 4 pages.
Rohm and Haas, "Optidose 4210", Dec. 2002, 5 pages.
Rohm and Haas, "Tamol 960 Tamol 731A", Aug. 1999, 4 pages.
Sadeghifar, et al., ACS Sustainable Chem. Eng., 2017, 5(1), 580-587.
Tolbert et al., "Characterization and analysis of the molecular weight of lignin for biorefining studies," DOI: 10.1002/bbb.1500; Biofuels, Bioprod. Bioref. (2014).
Zakzeski, "The Catalytic Valorization of Lignin for the Production of Renewable Chemicals", In Chem Rev., American Chemical Society, vol. 110, 2009, pp. 3552-3599 (Mar. 10, 2010).
Kent, M. et al., "Polyacid dispersants from lignin," no publication date, 1 page.
Kent, M. et al., "Polyacid dispersants from lignin," Symposium on Biotechnology for Fuels and Chemicals, Apr. 27, 2016, Baltimore, MD.

* cited by examiner

CONVERSION OF LIGNIN INTO A WATER-SOLUBLE POLYACID USING A MOF CATALYST

CROSS-REFERENCE TO RELATED APPLICATIONS

This applications claims priority to provisional application 62/305,402, filed on Mar. 8, 2016, entitled "Conversion of lignin into a water-soluble polyacid using MOFs." This prior application is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

FIELD

This disclosure relates to processing of biomass materials into useful materials. More particularly, it relates to oxidation of lignin using metal-organic framework catalysts in aqueous solvents.

BACKGROUND

Lignin is a class of cross-linked phenolic polymer found in plants. Currently, lignin is produced in large quantities by the pulp and paper industry. It is also produced as a byproduct of the biofuels industry. As the production of the biofuels industry increases over the coming years, the amount of lignin generated is expected to increase dramatically. There are currently no economically-viable processes converting lignin into value-added chemicals or drop-in fuels. This is due to lignin's complex chemical structure and resistance to depolymerization.

Conventional lignin depolymerization processes use aggressive reagents, are energy intensive (400-800° C.), and yield complex product mixtures. Milder reaction conditions and narrower product distributions could be achieved using lignin-degrading enzymes, but as of the present, enzymatic processes to depolymerize lignin are very slow and have very low yields. An alternative approach to valorizing lignin is to functionalize the polymeric material rather than depolymerize it. Iron and other metal salts and metal-chelating molecules used in Fenton chemistry reactions are capable of transforming lignin into a functionalized polymer at room temperature; however, in these homogenous reactions, the iron or other metal and metal-chelators must be separated from the lignin-derived product, which adds significantly to the cost of the process.

Metal-organic frameworks (MOFs) are crystalline materials with a nanoporous supramolecular structure consisting of metal ions connected by organic ligands. Their tailorable porosity, ease of synthesis, and ultra-high surface areas, combined with a broad choice of suitable building blocks, make them promising materials for gas storage, chemical separation, chemical sensing, and drug delivery. Recent work by several scientists demonstrate that MOFs can be effective catalysts for a variety of reactions. (Lee, J., O. K., Roberts, J., Scheidt, K. A., Nguyen, S. T., Hupp, J. T. "Metal-organic framework materials as catalysts," *Chemical Reviews* 2011, 112, 1105). However, in most cases the catalyzed reactions do not involve bond cleavage as is required for decomposing lignin and fragments thereof that are produced by various methods currently under consideration for either depolymerizing or solubilizing the polymer.

SUMMARY

A process for valorization of lignin includes the steps of mixing lignin; a MOF catalyst metalated with a metal atom selected from the group consisting of Fe, Mn, Co, Cu, or Ni, and combinations thereof; an oxidizing agent; and an aqueous solvent.

A reaction mixture includes: lignin; a MOF catalyst metalated with a metal atom selected from the group consisting of Fe, Mn, Co, Cu, or Ni, and combinations thereof; an oxidizing agent; and an aqueous solvent.

A dispersion includes a charged polyacid-containing species derived from lignin, a dispersible particulate material, and an aqueous dispersing medium.

The above description presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
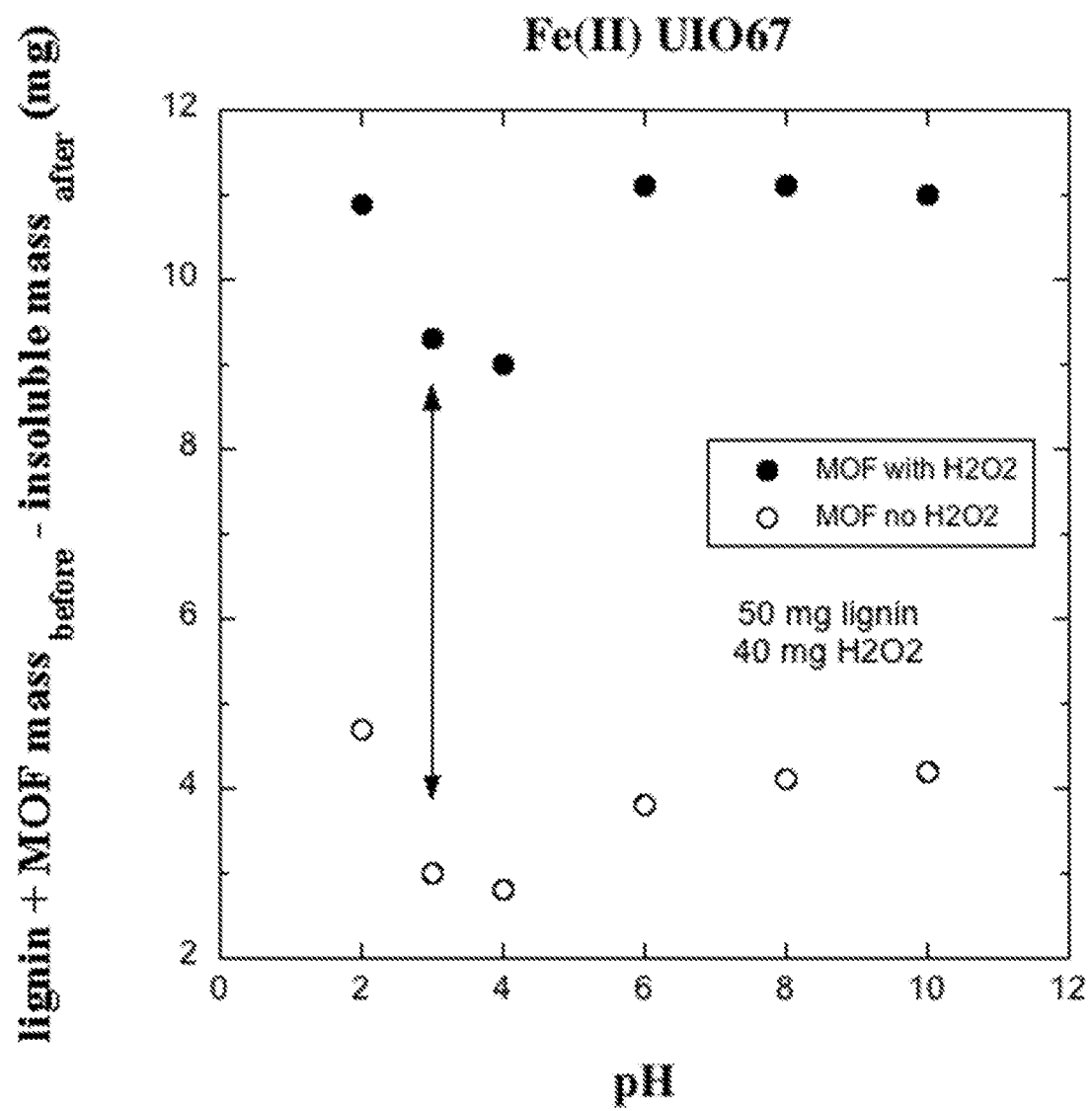
FIG. 1 is a graphical plot showing an example of how the mass of lignin solubilized by a reaction is determined from the difference between the quantity of lignin and catalyst before reaction and the quantity of insoluble material after the catalyzed oxidation reaction.

In an embodiment, the process disclosed herein enables the conversion of lignin into a charged, water-soluble polyacid material using oxidative metal-organic framework (MOF) catalysts. The charged, polyacid material can function as a dispersant, an antifouling or antiscaling agent, in, for example, water circulating equipment, such as boilers or cooling systems, and may have other useful commercial properties. This new technology for lignin processing has the potential to produce a valuable product from lignin in an economically-viable single-step process. The process disclosed herein is less complex than depolymerization of lignin and subsequent conversion of the complex chemical mixture to a single product or small number of products. The process disclosed here can produce a valuable commercial product directly from even the most intransigent portion of a lignin stream. This route avoids the problem of separating and upgrading a complex mixture of breakdown products, since the mixture of polyacids can constitute an effective dispersant without further upgrading or separation. The present invention can provide an economic benefit that will be magnified according to the price of polyacid product and the yield per mass of oxidant (e.g., $H_2O_2$) consumed.

Lignin is a class of cross-linked phenolic polymer found in a variety of plants and algae. It is a large, varied, and complex class of molecules. It is a random copolymer made up of monolignols (methoxy-substituted phenyl propenes) linked via C—C or C—O—C ether bonds. The three main monolignol units of lignin are p-coumaryl alcohol, coniferyl alcohol, and sinapyl alcohol. However, the structure and monomer content of the lignin polymer varies from source to source. It has an amorphous structure and is generally insoluble in water and alcohol. The weight average molecular weight (Mw) of lignin varies widely from about 1,000 to about 50,000, such as about 2,000 to about 25,000, or about 3,500 to about 15,000, and the measured value often depends on methods used to separate the lignin from the biomass, which often comprises cellulose and hemicellulose. See Tolbert et al., "Characterization and analysis of the molecular weight of lignin for biorefining studies," DOI: 10.1002/bbb.1500; Biofuels, Bioprod. Bioref. (2014) incorporated herein by reference. Due to its complexity, and the difficulty of separating lignin completely from the biomass it is taken from, neatly monitoring reactions and mechanisms with lignin and characterizing the results of the reactions is difficult.

Moreover, the approach disclosed herein to measure the success of the conversion was to test the properties of the processed lignin in a useful application as a dispersant of alumina particles. Accordingly, the interaction of the polyacid product with alumina particles was examined by zeta potential measurements. The results demonstrated that the lignin had been successfully converted to a valuable end product—a dispersant for alumina particles—that can be used in the ink industry, such as for use in ink for ink-jet printers.

The reaction mixture disclosed herein includes lignin, a MOF catalyst metalated with a metal atom selected from the group consisting of Fe, Mn, Co, Cu, or Ni, and combinations thereof; an oxidizing agent; and an aqueous solvent.

In an embodiment, the lignin is pre-processed to have a desirable molecular weight and molecular weight distribution (MWD). In an embodiment, an Mw (weight-average molecular weight) of the lignin may range from 1,000 to 4,000 g/mol, such as 1,500 to 3,500 g/mol, or 2,000 to 3,000 g/mol for a dispersant. The lignin, may, for example, have a polydispersity index (Mw/Mn (number-average molecular weight)) of 2 to 5, such as 2.2 to 4, or 2.5 to 3.5. Such pre-processing steps may be practiced as disclosed in Sadeghifar et al, ACS Sustainable Chem. Eng., 2017, 5(1), 580-587, which is herein incorporated by reference.

In an embodiment, the lignin is an organosolv lignin, but may also be a Kraft lignin, a lignin derived from ammonia, ionic liquid, enzymatic, mechanical, or various other pre-treatments of biomass, an unprocessed lignin, or a lignosulfonate. The lignin is in a powdered form prior to being dispersed into the aqueous solution. In an embodiment, the lignin may have a BET surface area of 0.01 $m^2/g$ to 1 $m^2/g$, such as, for example, 0.1 to 0.7, or 0.3 to 0.6 $m^2/g$.

The MOF catalyst used herein, should be selected to be stable in aqueous solvent. The MOF catalyst should also be insoluble in aqueous solvent for ease of recovery. The insolubility may be, for example, 90% or more insoluble, such as 95% to 99.9%, or 98% to 99% insoluble (by weight) at 25 C and 1 atm. The MOF catalyst should also have a high affinity for lignin in the aqueous dispersion. High affinity for lignin allows for generation of hydroxyl radicals within the MOF in close proximity to lignin for efficient use of the oxidant. The metalated MOF catalyst should include a transition metal that produces a catalytically reactive species, wherein the metal is attached to the MOF in a manner such that it does not dissociate from the catalyst in the aqueous reaction mixture, e.g. attached by a covalent bond. In a particular embodiment, an iron atom is chelated by a pyridine group-containing linker on the MOF, such as a bipyridine group, resulting in the reactive catalyst that is stable in aqueous solution.

In an embodiment, a zirconium-based MOF catalyst that is metalated with a transition metal in ionic form is utilized as the catalyst. In a particular embodiment, the MOF is metalated with $Fe^{2+}$ or $Fe^{3+}$. The MOF catalyst is both thermally and chemically stable and is recoverable from solution.

The metalated MOF catalyst is nanoporous. The term nanoporous includes materials having pore sizes of 0.2 to 1000 nm. In embodiments, the pore diameters may range from 1 nm to 200 nm, such as for example, 2 to 50 nm (subcategorized as mesoporous), or pore diameters of less than 2 nm, such as 0.2 to 2 m (sub-categorized as microporous). Pore diameters may be determined using the Barret-Joyner-Halenda (BJH) size distribution determination method from Brunauer-Emmett-Teller (BET) nitrogen isotherm measurements.

Several factors may be considered when using a MOF material as a catalyst. Typically, the pores of the MOF should be large enough to accommodate the reactant. However, for large lignin molecules it will not be possible for a large portion of the lignin molecule to enter into the pores. Despite this, the examples below showed that the metalated MOF is capable of catalyzing the reaction of lignin into polyacids when combined with an oxidizing agent. The MOF material should have high affinity for lignin in the aqueous dispersion. The MOF material should also be thermally and chemically stable under the reaction conditions. Ideally the MOF material should be easy to synthesize in large quantities and be cost-effective.

In an embodiment, a MOF catalyst is comprised of a plurality of nodes, each node comprised of at least a zirconium atom. A plurality of linkers comprising at least a linker including a heteroaromatic group. These linkers are coupled to the nodes and form a framework. In an embodiment, different linker groups may be present, such as linkers containing aromatic groups. A metal atom selected from the group consisting of Fe, Mn, Co, Cu, Ni, and combinations thereof are incorporated into the framework.

In an embodiment, a UiO-type MOF is used as the base for the metalated MOF catalyst. The term UiO is an abbreviation of Universitetet i Oslo (University of Oslo), and "UiO" along with a number is used by those of skill in the art as a short-hand way to designate certain MOF structures. For example, UiO-type MOFs include UiO-66, UiO-67, and UiO-68. UiO-type MOFs are characterized by a plurality of zirconium containing nodes, such as $Zr_6O_4(OH)_4$ nodes, connected by a plurality of linkers. The nodes and linkers are connected to form a nanoporous, supramolecular framework. UiO-type MOFs have face-centered-cubic (fcu), 12-connected topology.

Depending on the linker(s) used and the metal used in metalation, the BET surface area of a UiO-type MOF can range from 1,000 to 4,000 $m^2$ $g^{-1}$. For example, the BET surface area can range from 1200 to 1400 $m^2$ $g^{-1}$, 1800 to 2000 $m^2$ $g^{-1}$, or 2500 to 3000 $m^2$ $g^{-1}$. In an embodiment, the UiO-type MOFs form a single, phase-pure product with crystal sizes ranging from 0.1 to 5.0 µm. For example, the crystal size can be 0.1 to 0.3 µm, 1.0 to 2.0 µm, or 3.0 to 4.5 µm. UiO-type MOFs demonstrate improved hydrothermal stability compared to other MOF structures. MOFs can have more than one type of linker. MOFs with more than one type of linker are called "multivariate" and are referred to as MTV-type MOFs. The presence of different linkers modifies the functionality of the MOF.

In an embodiment, the base for the metalated MOF catalyst is a MOF with $Zr_6O_4(OH)_4$ nodes and fcu 12-connected topology. In a more particular embodiment, the base for the metalated MOF is UiO-66, UiO-67, and UiO-68.

A UiO-67 MOF conventionally uses an aromatic group containing compound, such as biphenyl-4,4'-dicarboxylate anions (BPDC) as a linker. However, in an embodiment disclosed herein, the UiO type MOF is synthesized with a zirconium node coupled to linkers comprising a heteroaromatic group with a chelating site, such as 2,2'-bipyridine-5,5'-dicarboxylate anion (BPYDC). The chemical formula for BPYDC is $C_{12}H_6N_2O_4$. When BPYDC is used as a linker, the bipyridine site on BPYDC can be metalated with a number of transition metals, as disclosed herein, rendering the framework catalytically active.

In an embodiment, the bipyridine site on the BPYDC linker of MTV-UiO-67 can be metalated with a transition metal, wherein the transition metal can exist in a +2-oxidation state and can have a halide counterion, such as $Cl^-$ or $Br^-$. The metal does not have to be in the +2 oxidation state to be effective though. Fe in a +3 state is also effective, as shown below. For example, the transition metal may be selected from the group consisting of selected from the group consisting of Fe, Mn, Co, Cu, Ni, and combinations thereof. This metalation renders the MOF catalytically active. When a MOF is metalated, its name is preceded by the name of the metal used in metalation. For example, an MTV-UiO-67 MOF metalated with Fe is referred to as Fe-MTV-UiO-67. For further specificity, the ionization state of the metal can be included in the name. For example, a MTV-UiO-67 type MOF metalated with $Fe^{2+}$ can be referred to as Fe(II)-MTV-UiO-67 and a MTV-UiO-67 type MOF metalated with $Fe^{3+}$ can be referred to as Fe(III)-MTV-UiO-67.

In a more specific embodiment, an MTV-UiO-67 type MOF may be produced using the procedures described in the supplemental information to H. Fei, S. Cohen, "A robust, catalytic metal-organic framework with open 2,2'-bipyridine sites," Chem. Commun., 2014, 50, 4810, which is incorporated herein by reference. Generally, $ZrCl_4$ is mixed with BPYDC in a bath of a mild acid, such as glacial acetic acid, with a polar aprotic solvent, such as dimethylformamide (DMF), to form a solution. Fei discloses mixing BPYDC and BPDC linkers, but this can be adjusted to include only BPYDC linkers if desired. Solids are then dispersed via sonication, followed by incubation and cooling. After cooling, solids are collected by centrifugation and the solvent is decanted. The solids are washed, such as with DMF, several times, followed by being soaked in an alcohol, such as methanol, for several days. After several days of soaking, solids are collected via centrifugation and dried under vacuum.

In an embodiment, the bipyridine site on the BPYDC linker is metalated with a metal salt. The metal salt can comprise a transition metal paired with a halogen or other anionic species. For example, the transition metal atom can be selected from the group comprising Fe, Mn, Co, Cu, Ni, and combinations thereof. The halogen may, for example, be selected from the group comprising Cl or Br.

In an embodiment, metalation is achieved by mixing 50 to 400 parts of the base MOF material with 20 to 100 parts of a metal salt, with a polar aprotic solvent. The polar aprotic solvent may be selected, for example, from the group comprising acetonitrile, dimethylformamide, or acetone. The mixture is then mixed or sonicated to dissolve the metal salt. The mixture may then be placed in a 65 to 120° C. oven for 18 to 24 hours, or however long is necessary to let the reaction go to completion, after which, the mixture is cooled to room temperature.

In an embodiment, the mixture is then centrifugated to separate the components of the reaction. The supernatant is decanted and fresh polar aprotic solvent is added to the centrifuge tube. The centrifuge/decanting process with fresh solvent, such as acetonitrile, is repeated as necessary to purify the product.

After the last decanting step is performed, additional centrifuge/decanting steps may be conducted, this time using a different polar aprotic solvent. The now metalated MOF catalyst may be placed under dynamic vacuum for 12 to 24 hours, or however long is necessary to isolate the metalated MOF catalyst in powder form.

After metalation with the metal salt and sufficient purification, the metalated MOFs are ready for catalytic use. Characterization using powder x-ray diffraction (PXRD) may be performed to confirm that the crystallinity of the metalated MOFs remains intact after metalation with the metal salts.

The metalated MOF catalyst is typically in the form of a powder with a surface area as described above. This provides a large area for molecules to interact with the catalytic sites. This can be provided in a reactor as a packed bed. In another embodiment, the metalated MOF catalyst can be coated onto a reactor. In such an embodiment, the reactor itself may comprise the catalyst for the conversion of the lignin. The coated reactor may be reused with an intact catalytic coating after the reactants are purged and a new reaction may be started without having to add MOF catalyst.

In an embodiment, the oxidant used in the reaction disclosed herein is a peroxide containing species. For example, hydrogen peroxide ($H_2O_2$.), organic hydrogen peroxide ($R^1$—O—O—H), or peracid $R^1$—C(O)O—O—H, may be used, wherein $R^1$ and $R^2$ are hydrocarbon moieties, such as, a $C_1$ to $C_{32}$ alkyl straight, branched, or cyclic group. Ozone, ozonide, superoxide ($O_2^-$) and even oxygen, may also be used as the oxidizing agent.

An aqueous solvent is utilized in the reaction disclosed herein. The water may be purified, deionized, and/or distilled, but is not necessarily any of these. In fact, an advantage of using the aqueous solvent, is that the reaction can be scaled up with little cost and some tolerance for impurities in a low cost aqueous solvent.

In an embodiment, the reaction mixture comprising the lignin, metalated MOF catalyst, oxidant, and aqueous solvent has a pH of 1.5 to 11.5, such as 5 to 10, or 5.5 to 6.8. The wt % loading of lignin in the dispersion may be 0.5% to 20%, such as 1% to 15%, or 3% to 10%. The oxidant and metalated MOF may be present in the reaction mixture in a mass ratio ranging from 1:1 to 20:1, such as, for example, 3:1 to 15:1, or 1:1 to 10:1. The lignin and metalated MOF may be present in the reaction mixture in a mass ratio ranging from 1:1 to 400:1, such as, for example, 5:1 to 100:1, or 10:1 to 50:1. The reaction may take place in a batch reactor or in a continuous reactor.

In an embodiment, a process for valorization of lignin includes mixing lignin, a MOF catalyst metalated with a metal atom selected from the group consisting of Fe, Mn, Co, Cu, or Ni, and combinations thereof, an oxidizing agent, and an aqueous solvent. The various components of the reaction process are discussed above. In an embodiment, the metalated MOF catalyst is a recovered metalated MOF catalyst from a previous iteration of the process for valorization of lignin.

The reaction proceeds with mixing, and heat may be applied to the reaction mixture if desired to raise the kinetic energy of the mixture and speed the process up. However, for scaled-up versions of the process, adding heat energy is likely not economical. In fact, a factor in the utility of this catalytic method is that it is not an energy intensive process.

As the reaction progresses, the metal atom in the metalated MOF catalyst reacts with the oxidizing agent to produce a hydroxyl radical. The hydroxyl radical then reacts with an aromatic ring on the lignin, breaking an aromatic bond causing the ring to open and producing acid groups. The pH of the reaction mixture can range from 2 to 10, such as, for example, 5.5 to 9, or 6 to 7.5.

As discussed above, lignin is notoriously recalcitrant to degradation. This is due to its highly crosslinked structure involving ether bonds and C—C bonds; however, by modifying the lignin by opening its aromatic ring structure a useful polyacid can be obtained with low energy and using a recoverable catalyst.

In an embodiment, in another step of the process, the MOF catalyst is recovered from the reaction mixture after formation of the polyacid. The catalyst can be recovered from the aqueous dispersion by filtration or centrifugation or other known solid recovery techniques from aqueous dispersions. In an embodiment, the recovered MOF catalyst will be intermixed with any lignin that is not sufficiently oxidized to become water soluble.

The polyacid material can be recovered from the reaction mixture with known methods as the polyacid is soluble whereas the catalyst and unreacted lignin are insoluble. The polyacid product of the reaction is a charged species that, when mixed with organic or inorganic particles will result in a zeta potential of, for example, −35 mV or greater, such as −40 to −70 mV, or −60 to −80 mV, at alkaline pH values, or a zeta potential of −30 to −80 mV at pH values above 4. Lower zeta potential values at more acidic pH values will be observed, such as 0 up to −35, or −20 to −35.

The charged polyacid molecules disclosed herein repel and can be used as a dispersant in various compositions, such as ink and other pigment- or dye-containing compositions, or other compositions that include dispersible particulate matter, such as, for example, metal particles, including aluminas and ceramic particles. Various compositions such as concrete or cosmetics may include particles dispersed with the lignin-derived material disclosed herein.

Accordingly, in an embodiment, a dispersion composition includes a charged polyacid-containing species derived from lignin, a dispersible particulate material, and an aqueous dispersing medium.

In an embodiment, the charged polyacid species derived from lignin is "derived from lignin" in the sense that it is the polyacid product of the lignin processed in the reaction disclosed herein with the metalated MOF catalyst and oxidant. Those of skill in the art understand that lignin is a complex class of molecules and it is impossible to describe the precise structures of all the diverse molecules within a given batch of lignin. Accordingly, in an embodiment, the charged polyacid-containing species derived from lignin is lignin with at least some of its aromatic rings opened to form acid groups resulting in a water-soluble polymer, as described above.

In an embodiment, such as where the dispersion composition is used in an ink dispersion, the dispersion composition has a viscosity that ranges from 1 cP to 25 cP and a surface tension of 10 to 50 dynes/cm, for example, 20 to 40, or 25 to 35 dynes/cm. For example, the viscosity of the dispersion composition may range from about 2 cP to about 15 cP, or 4 cP to about 10 cP. The pH of the dispersion should be 7 or greater to achieve the best results, such as 7.5 to 14. However, some dispersion effectiveness may be observed at lower pHs, including for example pH of 2 to up to 7, or pH of 5 to 6.5.

In an embodiment, the dispersible particulate matter is a pigment or dye, or a metal particle, such as aluminas or a ceramic. In an embodiment, the average particle size of the dispersible particulate material in the dispersion composition may be 500 nm or less. For example, the average particle size may range from 50 nm to 350 nm, or from 75 nm to 275 nm or from 100 nm to 250 nm. The dispersible particulate material may be positively- or negatively-charged or neutral.

In an embodiment, the lignin-derived charged material will adsorb onto alumina that is either positively (pH<8.5) or negatively charged (pH>8.5). However, the overall charge on the particles after adsorption of the lignin-derived material is greatest at pH 7-9, so that is where the dispersal effect is greatest. In an embodiment, the lignin-derived charged polyacid and particulate material may be present in a mass ratio ranging from 1:16,000 to 1:250, such as, for example, 1:8,000 to 1:500, or 1:2,000 to 1:1000.

In an embodiment, the lignin-derived polyacid material is essentially exclusive of, such as less than 1%, less than 0.5%, or less than 0.01%, of sulfonate groups. In an embodiment, the lignin-derived polyacid material comprises open aromatic rings. In an embodiment, the dispersion is exclusive of carbon nanotubes and/or surfactant. In an embodiment, the lignin-derived material is essentially exclusive of such as less than 1%, less than 0.5%, or less than 0.01%, of polyacrylic acid groups or polymaleic acid groups by mole.

EXAMPLES

Examples 1 and 2

Synthesis of Fe-II (Example 1) and Fe-III (Example 2) doped UiO-67-BPYDC $ZrCl_4$ (49 mg, 0.21 mmol), glacial acetic acid (380 mg, 6.29 mmol), and $H_2BPYDC$ (2,2'-bipyridine-5,5'-dicarboxylic acid) (52 mg, 0.21 mmol) were placed in a teflon-lined reactor with 10 mL of dimethylformamide DMF. The solids were dispersed via sonication for about 10 minutes, followed by incubation at 120° C. for 24 hours.

After cooling, solids were collected by centrifugation and the solvent was decanted. The solids were washed with DMF (2×20 mL), followed by soaking in methanol (MeOH) for 48 hours, and the solution was exchanged with fresh MeOH (10 mL) 5 times.

After soaking, the solids were collected via centrifugation and dried under vacuum to yields the un-doped MOF powder.

Fe(II) and Fe(III) were incorporated into the framework by infiltration of 1.5 M solutions of the respective chlorides in methanol by mixing with the MOF powder.

The mixtures were sonicated to dissolve the respective iron chlorides in the acetonitrile and placed in an 80° C. oven for 24 hours, the mixtures were removed and cooled to approximately 20-25° C. (room temperature).

The mixtures were then centrifugated and decanted. In order to obtain the metalated MOF catalysts in solid powder form, the mixtures were placed in a Schlenk flask under dynamic vacuum for 18 hours.

Example 3

Reaction of Lignin, Fe(II) UiO-67-BPYDC and $H_2O_2$. and Comparison to Control

A series of experiments were conducted to determine the effectiveness of the metalated MOF catalyst and the oxidant to catalyze the reaction of lignin and turn it into a water-soluble material.

50 mg of lignin powder (organosolv lignin from Lignol Corp) were combined with 5 mg of the Fe(II) MOF catalyst of Example 1 in 8 mL of water in a 20 mL vial and stirred with a magnetic stir bar for 24 hours at room temperature. After 24 hours of stirring, 115 μL of 35% $H_2O_2$. (=40 mg $H_2O_2$.) were added to initiate the reaction. The pH of the reaction was adjusted from 2 to 10 (FIG. 1).

After 48 hours the stirring was stopped and the dispersion was centrifuged at 13000 rpm for 5 minutes to separate the solids from the liquid products. The solid residues were exhaustively dried and the dry weights of solids remaining were recorded.

A control was also performed with identical conditions except that no $H_2O_2$ was added. A second control was performed with identical conditions except that no metalated MOF was added. A third control was performed with identical conditions, except that no metalated MOF was added and no $H_2O_2$ was added.

FIG. 1 shows a graph of the results of the experiment along with the first control reaction for the described experiment. The difference in the combined mass of lignin and catalyst before reaction and insoluble solids after reaction was plotted on the graph for each experiment (pH value). FIG. 1 shows that for each pH, the experimental reaction that included the metalated MOF and $H_2O_2$ catalyst converted substantially more material to a soluble product than the control with no $H_2O_2$. In contrast, no difference in solubilized mass resulted with and without $H_2O_2$ in absence of the MOF catalyst (second and third controls).

Figure 2:
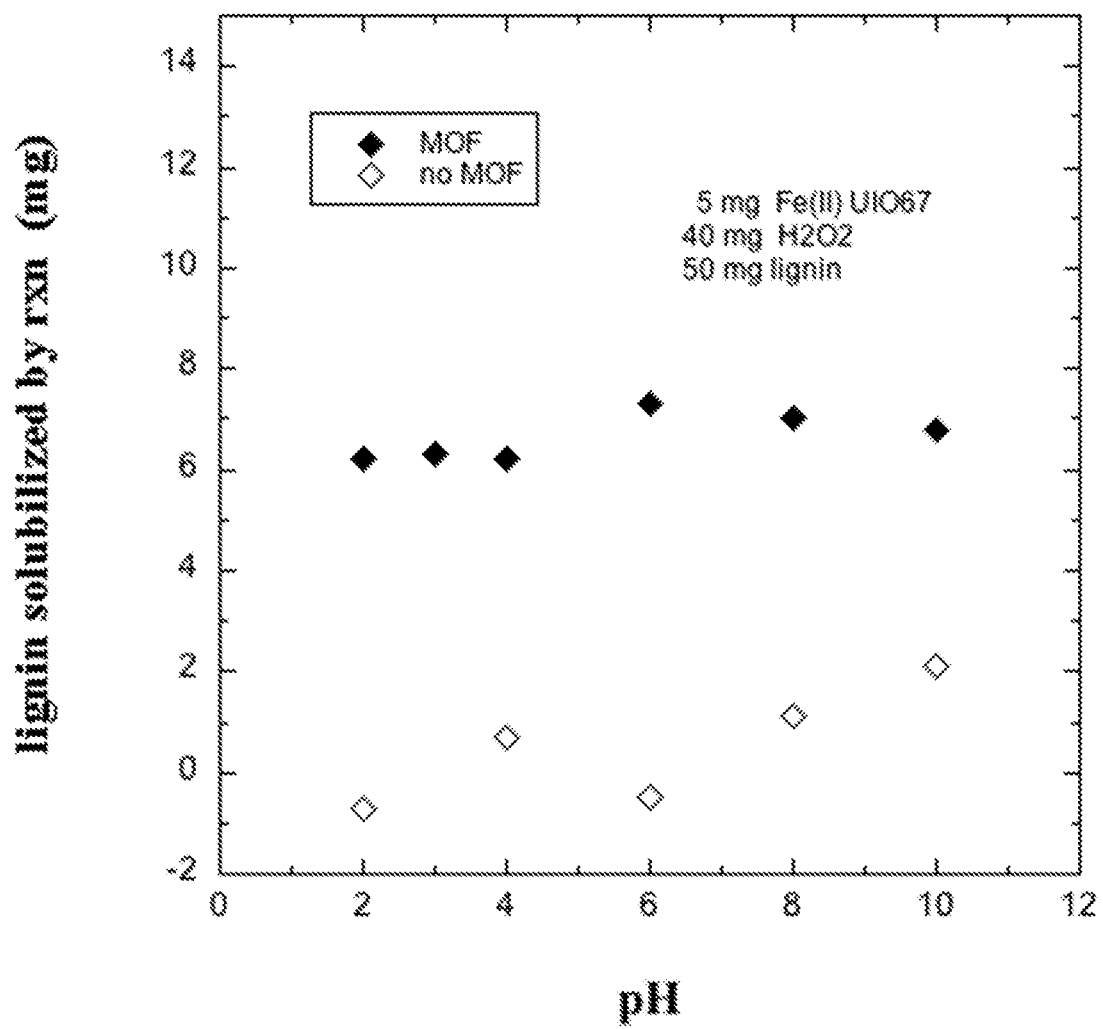
FIG. 2 is a graphical plot showing an example of lignin solubilized through the oxidation reaction catalyzed by Fe(II) UiO-67 MOF at various pHs compared with controls for which no catalyst was added.

The difference between the mass solubilized by the reaction involving the MOF and $H_2O_2$ and the mass solubilized for the control lacking $H_2O_2$, indicated by the arrow in FIG. 1, was reported as the mass solubilized by the reaction and is plotted in FIG. 2 for the five pH values. Results for the second control (no MOF) are also included in FIG. 2. This test established that a pH of about 6 was optimal, a range of about 6 to 10 was preferred, but the reaction went forward from at least a pH as low as 2 and as high as 10.

Example 4

Figure 3:
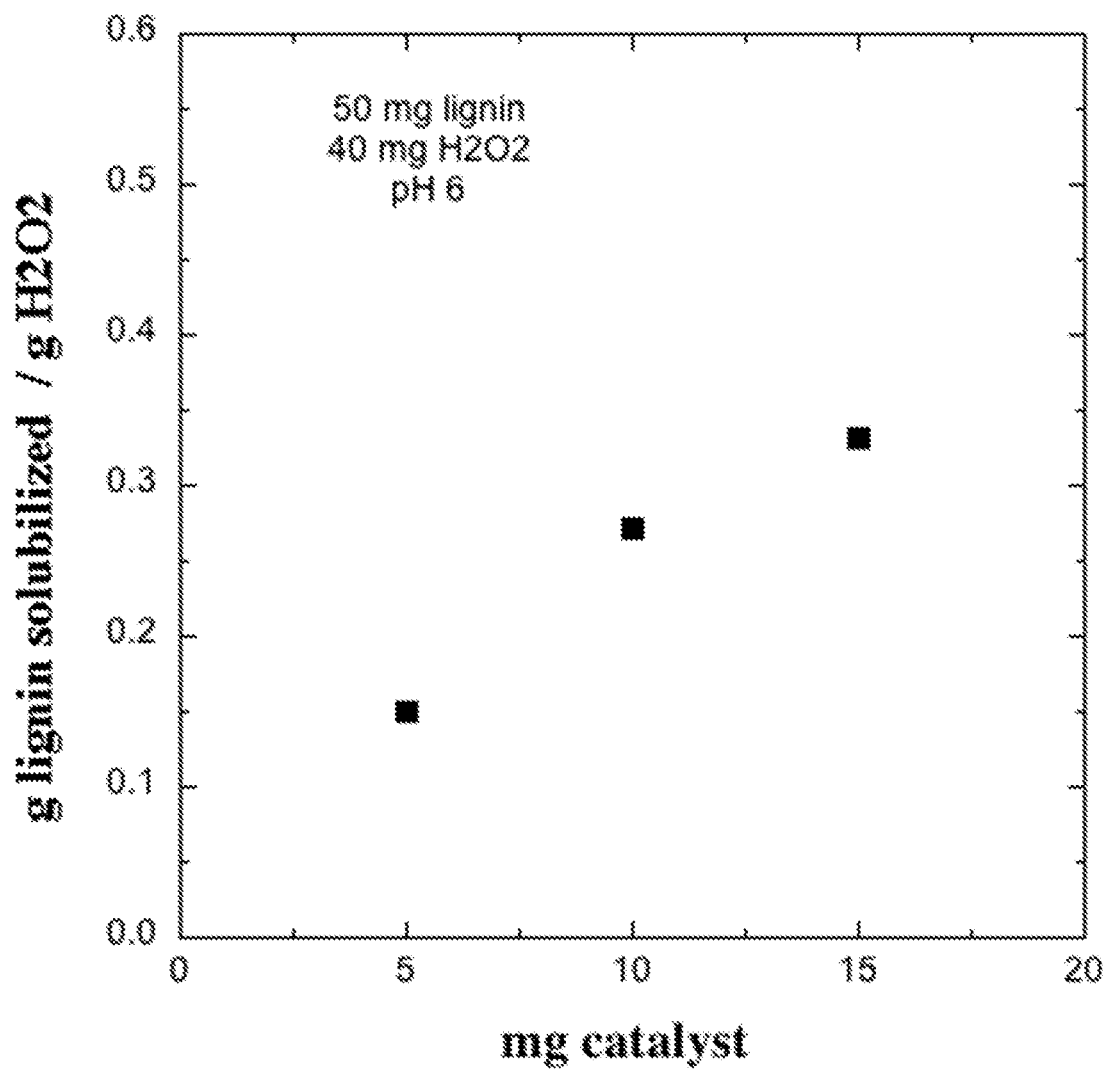
FIG. 3 is a graphical plot showing an example of the mass of lignin solubilized the reaction as a function of the amount of catalyst added.

In Example 4, the procedure in Example 3 for the reaction including the metalated MOF and $H_2O_2$ was performed for several loadings of the MOF Fe(II) UiO-67-BPYDC catalyst. FIG. 3 shows the results in terms of the mass of lignin solubilized by the reaction divided by the mass of $H_2O_2$ used as a function of the mass of MOF catalyst added. For 15 mg of catalyst the yield was 0.33 mg lignin solubilized per mg $H_2O_2$.

Example 5

Figure 4:
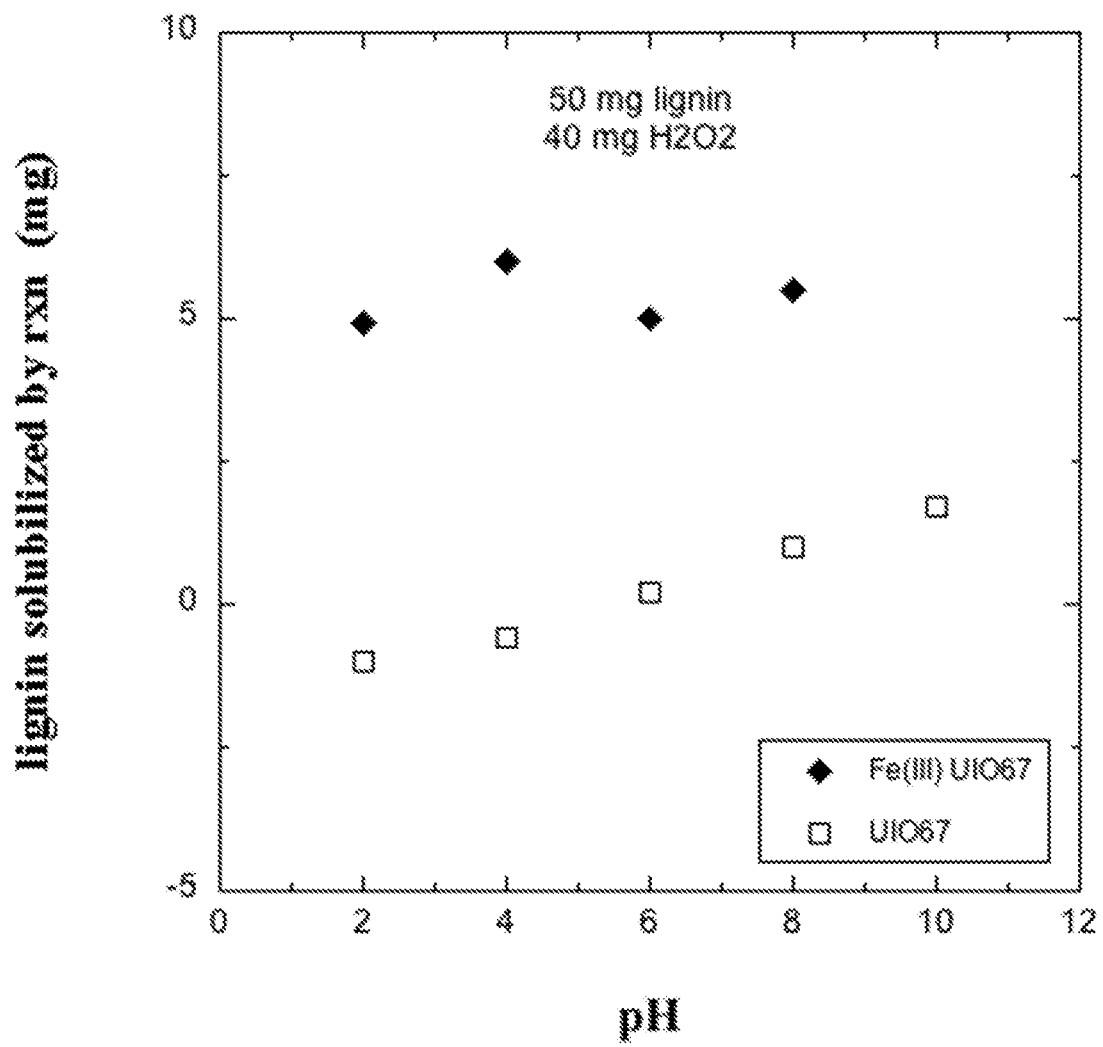
FIG. 4 is a graphical plot showing an example of lignin solubilized through the oxidation reaction catalyzed by Fe(III) UiO-67 MOF at various pHs.

In Example 5 the procedure in Example 3 for the reaction including the metalated MOF and $H_2O_2$ was performed for the MOF Fe(III) UiO-67-BPYDC catalyst (Example 2) over a range of pH from 2 to 8. The results are shown in FIG. 4, along with results for a control involving the UiO-67-BPYDC catalyst framework material that was not loaded with Fe. The experimental reaction that included the metalated MOF catalyst and $H_2O_2$ converted substantially more material to a soluble product than the control with no Fe(III) loaded into the MOF.

Example 6

Figure 5:
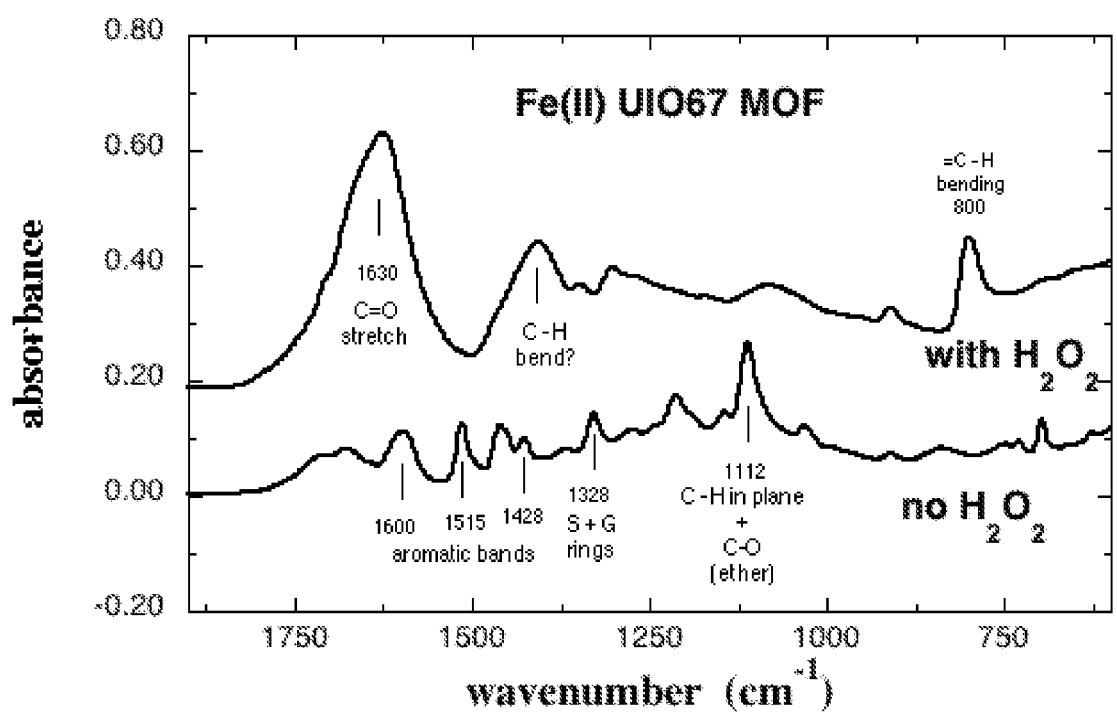
FIG. 5 is an example of a comparison of FTIR spectra for lignin before reaction and for solubilized lignin after the catalyzed oxidation reaction.

FIG. 5 shows the FTIR spectrum of lignin rendered soluble by a single batch reaction involving 5 mg Fe(II) UiO-67-BPYDC (Example 1), 40 mg $H_2O_2$, and 50 mg lignin as compared to a control where, in contrast, no $H_2O_2$ was used.

The FTIR spectra were collected from the water-soluble lignin material that was generated by the oxidation reactions described in Example 3 above. Several drops of the supernatant from the reaction were deposited onto Teflon substrates and the water was evaporated, leaving behind a residual film of the water-soluble products of the reaction. The material was scraped from the Teflon substrate and pressed against a Pike GladiATR diamond ATR single reflection crystal. IR spectra were collected with a Bruker Equinox 55 IR spectrometer with a DTGS (ID301/8) detector operating at room temperature. A total of 32 scans were co-added. Spectral resolution was 4 $cm^{-1}$. Spectra were referenced to air and an atmospheric correction applied to the data to remove water and $CO_2$ vapor contributions.

FIG. 5 shows the spectrum of the lignin-derived water-soluble material that results from the reaction (with $H_2O_2$) along with the spectrum of water-soluble lignin in absence of reaction (no $H_2O_2$). Lignin is generally insoluble in water but due to chemical and molecular weight heterogeneity of the lignin, a small fraction of the sample (about 2%) is water soluble and was used for this measurement. The spectra show that upon reaction, the aromatic bands disappear and large bands appear at 1630 $cm^{-1}$ and 800 $cm^{-1}$ that correspond to carbonyl and alkene groups, respectively. These changes in the IR spectra are consistent with opening of the aromatic rings during oxidation to yield alkenes and acid groups.

Example 7

Figure 6:
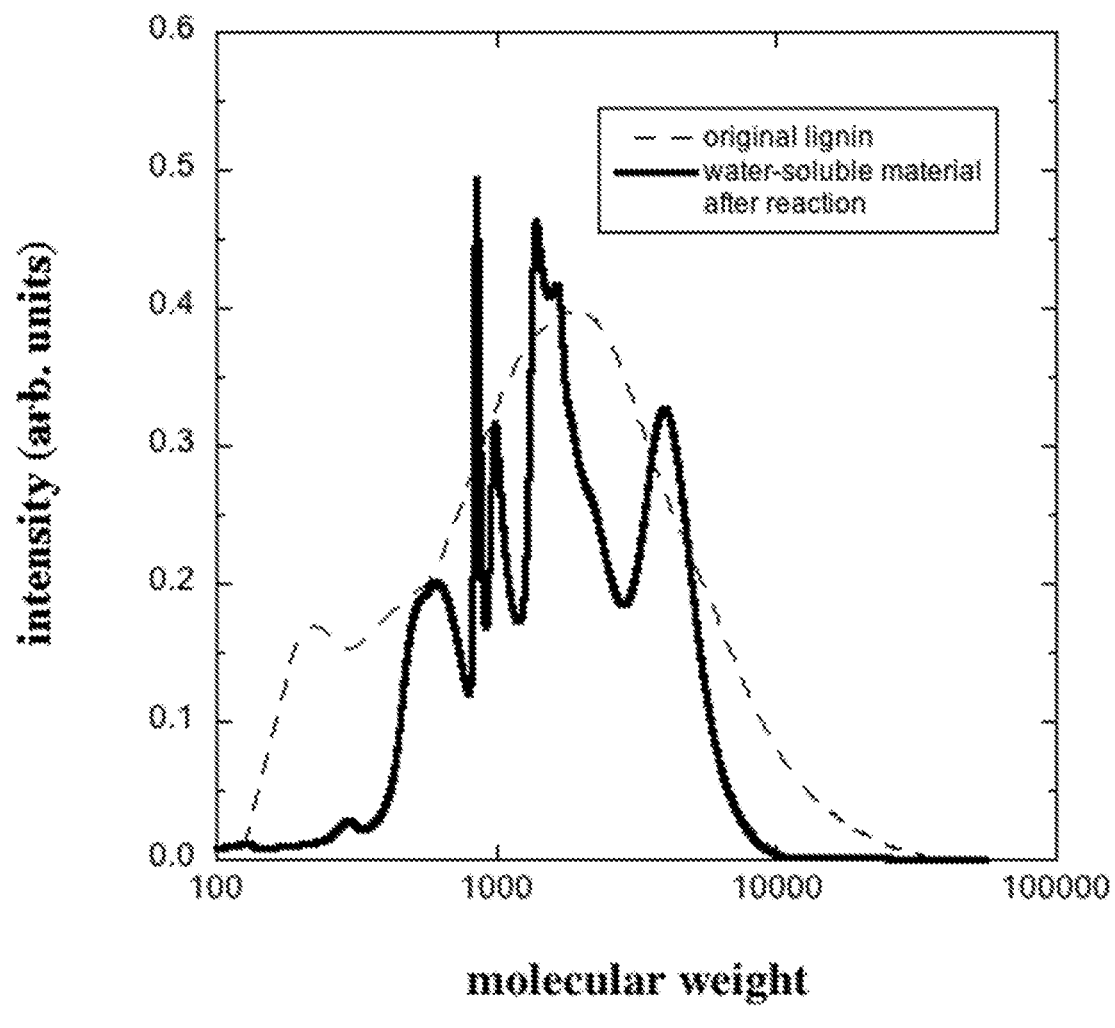
FIG. 6 is a graphical plot showing an example of the molecular weight distribution from GPC analysis before reaction and for solubilized lignin after the catalyzed oxidation reaction.

FIG. 6 shows an example of a molecular weight distribution (MWD) from gel permeation chromatography (GPC) of lignin-derived material rendered soluble by a single batch reaction involving 5 mg Fe(II) UiO-67-BPYDC (Example 1), 40 mg $H_2O_2$, and 50 mg lignin at pH 6 as compared to the MWD of the same lignin prior to reaction. The MWD of the water-soluble lignin-derived material was measured using an Agilent 1260 HPLC with a UV detector and a PL Aquagel 30 size exclusion column with a mobile phase of 100% water at 0.25 ml/min. Narrow molecular weight distribution poly(acrylic acid) standards were used for calibration. The MWD of the lignin prior to reaction was measured using an HP 1100 HPLC with an RI detector and Waters Styrogel HR-4 and HR-4E size exclusion columns with a mobile phase of 100% tetrahydrofuran at 1.0 ml/min. Narrow molecular weight distribution polystyrene standards were used for calibration. To ensure full solubility in THF, the lignin was acetylated prior to analysis, as is common in the field (El Hage et al, Polymer degradation and Stability, 2009, 94, 1632-1638). To acetylate the lignin, 0.5 ml of pyridine and 0.5 ml of acetic anhydride were added to 10 mg of lignin and the reaction was run overnight at room temperature. After reaction the pyridine and acetic anhydride were evaporated with a stream of dry nitrogen. 1 ml of ethanol was then added and evaporated with a stream of dry nitrogen. This was repeated two more times to ensure complete removal of the pyridine and acetic anhydride. The dried material was then dissolved in THF, filtered, and injected into the GPC. The MWD results in FIG. 6 show that the lignin rendered water-soluble by the reaction has a molecular weight distribution that is comparable to that of the original lignin. For the reaction described above, the weight average molecular weight of the water-soluble material after reaction is 3,100 g/mol, which is suitable for a polymeric dispersant. This shows that the oxidative reaction with MOF catalyst in aqueous solution does not substantially degrade the molecular weight. Therefore, the MWD can be adjusted to meet the needs of specific applications by preprocessing, such as fractionation, of the lignin.

Examples 8 and 9

Preparation of Dispersions for Zeta Potential Analysis

Alpha-aluminum oxide powder, $\alpha\text{-}Al_2O_3$, AKP-30 (Sumitomo), a ceramic particle, was used as the dispersible particulate material for testing dispersibility. Poly(acrylic acid) (PAA) with 2,000 g/mol molecular weight, $KNO_3$, $HNO_3$, and KOH were obtained from Sigma-Aldrich and used as received.

In Example 8, alumina powder, $KNO_3$ stock solution, aqueous lignin-derived dispersant solution, and water were combined to yield 1-4 mg lignin-derived water soluble dispersant per gram alumina powder at 10% solids loading. Dispersion was conducted using an ultrasonic probe (Branson ultrasonics) at 50% power for 10 minutes in a cup horn cell to break up weak agglomerates and disperse the powder.

A control example (Example 9) dispersion was also made in the same manner, except PAA was substituted for the same amount of the lignin-derived dispersant.

Example 10

Zeta Potential Analysis of Examples 8 and 9

A Stabino particle charge mapping instrument (ParticleMetrix, GmbH of Mebane, N.C.) was used to evaluate the pH titration behavior of the alumina particles and the effect of the lignin-derived polyacid materials (Example 8) against the known dispersant poly(acrylic acid) (Example 9).

The zeta potential was measured on dilute dispersions of Sumitomo AKP-30 alumina powder ($\alpha\text{-}Al_2O_3$) in $10^{-3}$ M $KNO_3$ electrolyte solution as a function of pH. The initial suspension was adjusted to pH 10 using 0.1 M KOH solution, and zeta potential vs. pH was determined using a dynamic addition profile (aliquots between 10-100 microliters, and 10 to 25 seconds between each measurement point) to titrate to pH 4 with 0.1 N $HNO_3$. Baseline values of the instrument performance were determined for the as-received alumina and for alumina in the presence of poly(acrylic acid) (PAA, Sigma-Aldrich, Mol. Wt. 2000).

Figure 7:
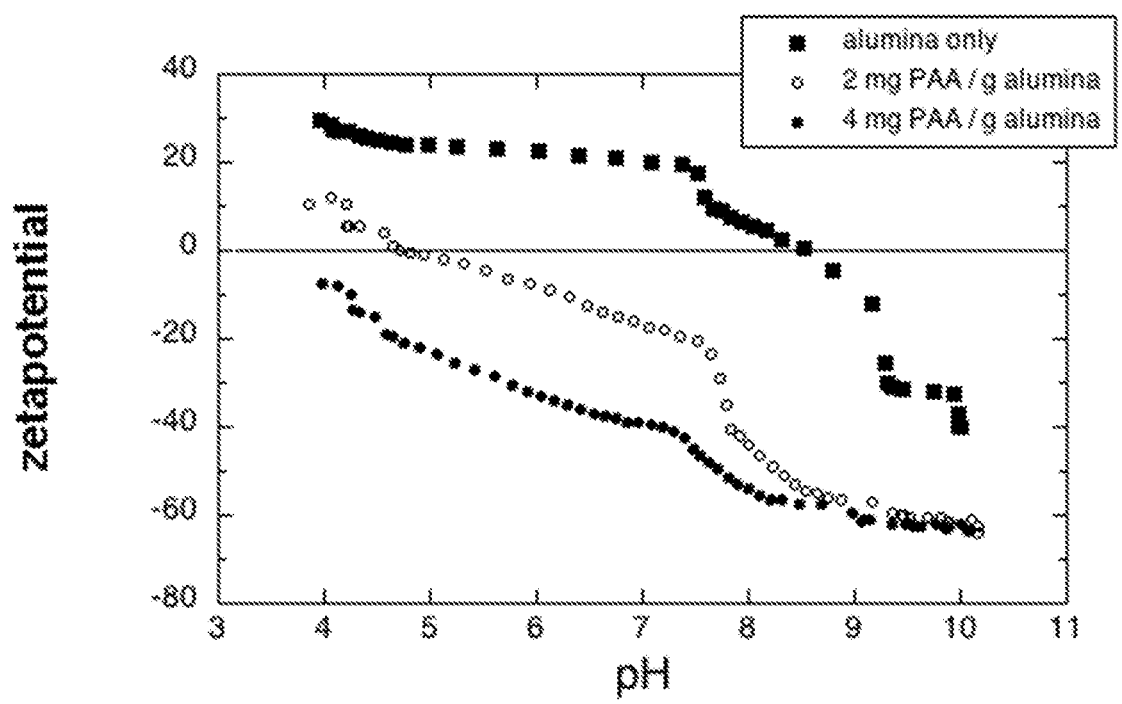
FIG. 7 is an example of a graphical plot of zeta potential vs. pH for a control involving a commercial poly(acrylic acid) dispersant mixed with alumina.

FIG. 7 shows zeta potential measurements of AKP-30 alumina (Sumitomo) and 2 mg PAA/g alumina and 4 mg PAA/g alumina, along with a control containing 0 mg PAA/g alumina as a function of pH. The data indicate agreement with literature sources for the charging behavior of aluminas and for the effect of the commercial PAA control on the zeta potential and isoelectric point (IEP). In FIG. 7, the isoelectric point of alumina with PAA adsorbed to the surface shows a decline as PAA concentration increases. As is known for PAA and aluminas, full protonation of the polyelectrolyte occurs in alkaline condition, and a high value of zeta potential corresponds to a colloidally-stable dispersion capable of fluid performance at very high volumetric solids content.

Figure 8:
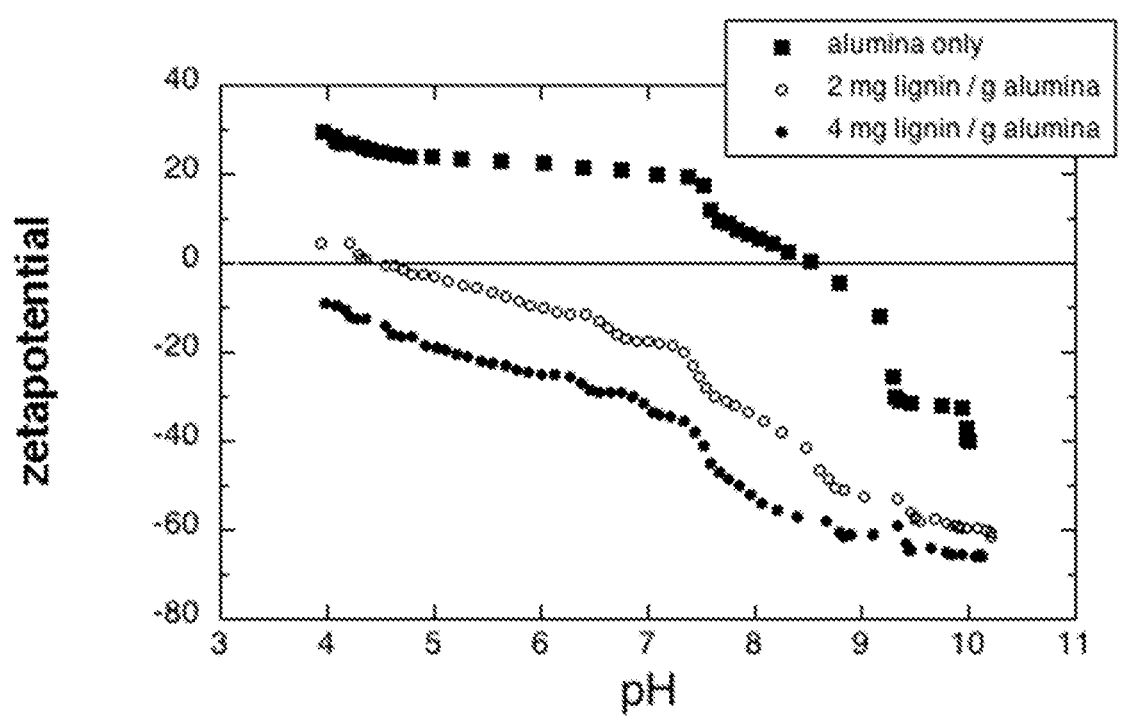
FIG. 8 is an example of a graphical plot of zeta potential vs. pH for lignin-derived polyacid dispersant from Fe(II) UiO-67-catalyzed reaction at pH 2 mixed with alumina.
Figure 9:
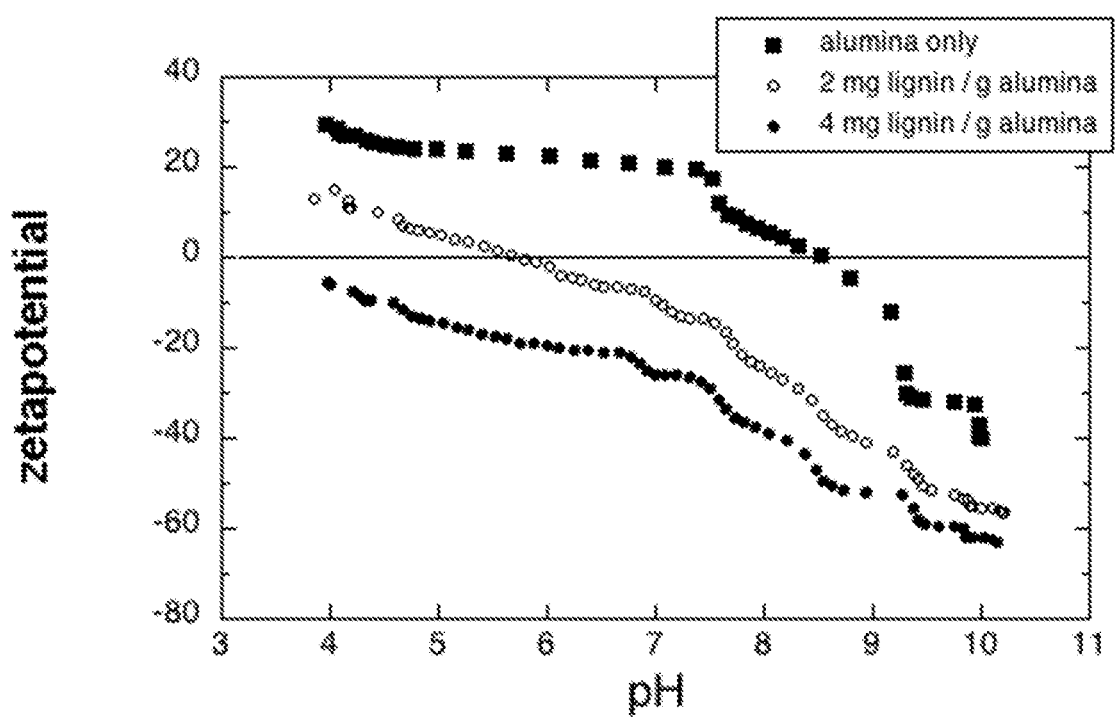
FIG. 9 is an example of a graphical plot of zeta potential vs. pH for lignin-derived polyacid dispersant from Fe(II) UiO67-catalyzed reaction at pH 6 mixed with alumina.

Lignin-derived material from reactions involving the metalated MOF catalyst (Fe(II) UiO-67-BPYDC (Example 1)) at pH 2 (FIG. 8) and pH 6 (FIG. 9) was tested for the ability to disperse alumina powder in zeta potential measurements (Example 8). The dispersant mixtures contained 2 mg lignin-derived material/g alumina and 4 mg lignin-derived material/g alumina, along with a control containing 0 mg lignin-derived material/g alumina. The response of the particle zeta potential is similar to that for the commercial PAA (Example 9). In both FIGS. 8 and 9, the zeta potential values exceed −50 mV (absolute value) under alkaline conditions, which is the criteria for strong electrosteric stabilization of a dispersion in a slurry. These zeta potential results suggest that the lignin-derived product from reactions involving the metalated MOF catalyst (Example 8) perform as well as commercial poly(acrylic acid) (Example 9) with respect to dispersing alumina particles.

It should be noted that the MOF catalyst used in the examples can be recovered and reused using standard solid recovery processes.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

What is claimed is:

1. A process for valorization of lignin comprising:
   mixing
   lignin,
   a MOF catalyst metalated with a metal atom selected from the group consisting of Fe, Mn, Co, Cu, or Ni, and combinations thereof;
   an oxidizing agent; and
   an aqueous solvent;
   wherein the pH of the mixture is 2 to 10; and
   recovering a product comprising a charged polyacid, wherein the charged polyacid when mixed with an alpha-aluminum oxide powder and water results in a zeta potential of the resulting dispersion of −30 to −80 mV at pH values above 6.

2. The process of claim 1, wherein the MOF catalyst is a recovered MOF catalyst.

3. The process of claim 1, wherein the metal atom is Fe.

4. The process of claim 1, wherein the MOF catalyst comprises a node, the node including a zirconium atom; and the MOF catalyst comprises a linker including a heteroaromatic group, the linker being coupled to the node.

5. The process of claim 1, wherein the MOF catalyst comprises a bipyridine-containing linker group.

6. The process of claim 1, wherein the metal atom in the MOF catalyst reacts with the oxidizing agent to make a hydroxyl radical.

7. The process of claim 6, wherein the hydroxyl radical reacts with an aromatic ring on the lignin causing the aromatic ring to open.

8. The process of claim 1, wherein the oxidizing agent is a peroxide containing species.

9. The process of claim 1, wherein a weight-average molecular weight of the lignin ranges from 1,000 to 4,000 g/mol.

10. The process of claim 1, wherein an aromatic ring on the lignin is opened by one or more reactants.

11. The process of claim 1, wherein the pH of the mixture is 2 to 6.

12. A process for valorization of lignin comprising:
    mixing
    lignin,
    a MOF catalyst metalated with a metal atom selected from the group consisting of Fe, Mn, Co, Cu, or Ni, and combinations thereof;
    an oxidizing agent; and
    an aqueous solvent;
    wherein the pH of the mixture is 2 to 10;
    further comprising recovering the MOF catalyst.

13. The process of claim 12, wherein the MOF catalyst comprises a node, the node including a zirconium atom; and the MOF catalyst comprises a linker including a heteroaromatic group, the linker being coupled to the node.

14. The process of claim 12, wherein the metal atom is Fe.

15. A reaction mixture comprising:
    lignin;
    a MOF catalyst metalated with a metal atom selected from the group consisting of Fe, Mn, Co, Cu, or Ni, and combinations thereof;
    an oxidizing agent; and
    an aqueous solvent;
    wherein the oxidizing agent is a peroxide-containing species;
    wherein the pH of the mixture is 2 to 10;
    wherein the MOF catalyst comprises a node, the node including a zirconium atom; and the MOF catalyst comprises a linker including a heteroaromatic group, the linker being coupled to the node.

16. The reaction mixture of claim 15, wherein the lignin has an Mw/Mn ranging from 2 to 5.

17. The reaction mixture of claim 15, wherein the MOF catalyst is a recovered MOF catalyst.

18. The reaction mixture of claim 15, wherein the metal atom is Fe.

19. The reaction mixture of claim 15, wherein the MOF catalyst comprises a second linker including an aromatic group, the linkers being coupled to the nodes.

* * * * *